US012655027B2

(12) United States Patent
Lineen

(10) Patent No.:     US 12,655,027 B2
(45) Date of Patent:        Jun. 16, 2026

(54) COMPOSITE AMMONIUM DIURANATE GEL PARTICLES WITH A PHENOLIC RESIN PHASE, AND METHODS OF MAKING THE SAME

(71) Applicant: X-ENERGY, LLC, Rockville, MD (US)

(72) Inventor: Nick Lineen, Knoxville, TN (US)

(73) Assignee: X-ENERGY, LLC, Rockville, MD (US)

( * ) Notice: Subject to any disclaimer, the term of this patent is extended or adjusted under 35 U.S.C. 154(b) by 531 days.

(21) Appl. No.: 18/194,362

(22) Filed: Mar. 31, 2023

(65) Prior Publication Data

US 2024/0327226 A1     Oct. 3, 2024

(51) Int. Cl.
*C01B 32/907*        (2017.01)
*C01B 32/928*        (2017.01)
(Continued)

(52) U.S. Cl.
CPC .......... *C01B 32/907* (2017.08); *C01B 32/928* (2017.08); *C08G 8/10* (2013.01);
(Continued)

(58) Field of Classification Search
None
See application file for complete search history.

(56) References Cited

U.S. PATENT DOCUMENTS 2,672,452 A     3/1954  Wankat
3,939,233 A     2/1976  Bildstein
(Continued)

FOREIGN PATENT DOCUMENTS

CN      112521151 A   *  3/2021   ............. C04B 35/51
DE         1283199 B      7/1965
(Continued)

OTHER PUBLICATIONS

English translation of DE 2323072 A1 Description. (Year: 1973).*
(Continued)

*Primary Examiner* — Anthony J Zimmer
*Assistant Examiner* — Zachary John Baum
(74) *Attorney, Agent, or Firm* — Kramer & Amado, P.C.

(57)                ABSTRACT

Composite gel particles with an ammonium diuranate matrix phase and a phenolic resin phase incorporated within the ammonium diuranate matrix phase are produced from a first solution comprising uranyl nitrate, a phenol, and optionally formaldehyde, wherein the uranyl nitrate and the phenol are present in a ratio ranging from 2:1 to 25:1; and a second solution comprising hexamethylenetetramine and urea. The first solution and the second solution are mixed, and drops of the resulting mixture into a heated second liquid which is immiscible with the mixed solution. Heat from the second liquid causes the hexamethylenetetramine to decompose to form ammonia, which reacts with the uranyl nitrate to cause each of the drops to form an ammonium diuranate gel particle. The ammonium diuranate gel particles are collected. The ammonium diuranate gel particles include the phenolic resin phase within the ammonium diuranate matrix phase, where the phenolic resin phase is formed by reaction between the phenol and formaldehyde. The first solution may include uranyl nitrate, the phenol, and formaldehyde, and the formaldehyde and the phenol may react to form the phenolic resin phase prior to mixing the first solution and the second solution. The first solution may be free of formaldehyde, and heat from the second liquid may causes the hexamethylenetetramine to decompose to form formaldehyde in situ; so that the formaldehyde and the phenol react to form the phenolic resin phase while the ammonia reacts with the uranyl nitrate.

13 Claims, 5 Drawing Sheets

(51) Int. Cl.

| | | |
|---|---|---|
| *C08G 8/10* | (2006.01) | |
| *C08K 5/00* | (2006.01) | |
| *G21C 3/62* | (2006.01) | |

(52) U.S. Cl.

CPC ............ *C08K 5/0091* (2013.01); *G21C 3/623* (2013.01); *C01P 2006/44* (2013.01)

(56) References Cited

U.S. PATENT DOCUMENTS

| | | | |
|---|---|---|---|
| 4,119,563 | A | 10/1978 | Kadner |
| 9,047,993 | B2 | 6/2015 | Heit |

FOREIGN PATENT DOCUMENTS

| | | | | | |
|---|---|---|---|---|---|
| DE | 2147472 | A1 | * | 11/1973 | |
| DE | 2323072 | A1 | * | 11/1973 | |
| GB | 2056155 | A | * | 3/1981 | ............. G21C 3/623 |

OTHER PUBLICATIONS

English translation of CN-112521151-A Description. (Year: 2021).*
English translation of DE 2147472 A1 Description. (Year: 1973).*
Cox, Roy L. (2012). Engineered Tribological Composites—The Art of Friction Material Development—8.4.2.1 CNSL as a Binder. SAE International. Retrieved from https://app.knovel.com/hotlink/pdf/id:kt00U7E961/engineered-tribological/cnsl-as-a-binder. (Year: 2012).*
Koss et al., "Fabrication Methods and Evaluation of Uranium-Thorium-Carbide Fuel for High Temperature Gas Cooled Reactors," Second International Thorium Fuel Cycle Symposium, May 3-6, 1966, Gatlinburg, Tenn. USA.
Bildstein, "Sol-Gel Processes for the Fabrication of Ceramic Fuel Particles for High-Temperature Reactors," Sol-Gel Processes for Ceramic Nuclear Fuels, International Atomic Energy Agency, Vienna, 1968.
Alford, "Production and Characterization of Uranium Sol Gel Surrogates Produced with Cerium Acetate and Cerium Nitrate," Clemson University, 2020. All Dissertations, 2834.
Silverman et al., "Resin Fuel Particles for High-Temperature Gas-Cooled Reactors," Oak Ridge National Lab., 1972.
Wei et al., "Sol-Gel Synthesis of Metal-Phenolic Coordination Spheres and Their De-rived Carbon Composites," Angew. Chem. Int. Ed. 2018, 57, 9838-9843.

* cited by examiner

COMPOSITE AMMONIUM DIURANATE GEL PARTICLES WITH A PHENOLIC RESIN PHASE, AND METHODS OF MAKING THE SAME

TECHNICAL FIELD

This disclosure generally relates to composite gel particles comprising an ammonium diuranate matrix phase and an organic resin phase.

BACKGROUND

Ceramic fuel kernels, particularly uranium-based ceramic fuel kernels, are used in the production of nuclear fuel particles. Uranium oxycarbide-based fuel particles have good temperature stability, and are of great interest for production of high-temperature nuclear reactors.

Metal oxide gel particles may be prepared by dispersion of droplets of a metal salt solution in a nonaqueous fluids, and causing the metal salt in the droplets to undergo internal gelation to form a gel phase in the form of metal oxide gel particles.

Metal oxide gel particles may be prepared from solutions of a variety of metal salts or metal oxide salts, including nitrates of uranium, thorium, plutonium, and lanthanide metals such as cerium. The salt solution contains hexamethylenetetramine (HMTA) and urea, and flows into a nonaqueous fluid which is immiscible with the salt solution. The nonaqueous fluid is heated to a temperature sufficient to induce HMTA decomposition.

In the case of a uranyl nitrate solution, before the salt solution contacts the drive fluid, metal ion-urea complexes of formula $UO_2((NH_2)_2CO)_2^{+2}$ form, where the urea may help mitigate premature gelation. When the metal ion-urea complexes are heated by the drive fluid, they may dissociate to form $UO_2^{+2}$ or similar uranium oxide species. Simultaneously, HMTA decomposes to form formaldehyde and ammonium hydroxide. HMTA decomposition takes place in two steps, as in reactions (1) and (2):

$$(CH_2)_6N_4 + H^+ \rightarrow ((CH_2)_6N_4H^+ \tag{1}$$

$$(CH_2)_6N_4H^+ + 9H_2O \rightarrow 6HCHO + NH_4 + 3\ NH_4OH \tag{2}$$

Metal ions hydrolyze and condense as in reactions (3) and (4):

$$(UO_2)^{+2}{}_{(aq)} + 2H_2O \rightarrow (UO_2(OH)_2)_{(aq)} + 2H^+ \tag{3}$$

$$2(UO_2(OH)_2)_{(aq)} \rightarrow 2UO_3 \cdot 2H_2O \tag{4}$$

Ammonium hydroxide generated during reaction (2) increases the pH of the solution promoting hydrolysis and condensation (3), resulting in reaction of $UO_2(OH)_2$ and/or $UO_3$ with $NH_4OH$ to produce ammonium diuranate as spherical gel particles. The ammonium diuranate gel spheres are collected and sintered to form ceramic particles useful as kernels for nuclear fuel pellets.

The incorporation of a carbon source during the sol-gel processing of ceramic kernels, particularly in the development of uranium ceramic fuel particles, may affect yield, density, size distribution, ease of fabrication, and processing cost. Incorporation of a carbon source also allows preparation of ceramic oxycarbide, dicarbide, monocarbide, and/or mononitride kernels during a subsequent sintering step.

However, it is difficult to mix solid forms of elemental carbon, e.g., carbon black or graphite, into aqueous wet chemistries. It is also difficult to develop stable suspensions of elemental carbon, so as to provide manageable flow and homogenous carbon distribution in the diuranate gel precursors for nuclear fuel kernels. To achieve homogeneous carbon distribution, additions of surfactants or emulsifiers to the sol-gel system are often required. Alternatively, homogeneous carbon distribution requires vigorous stirring and/or ultrasonic agitation of the sol, which leads to difficulties in scale-up of the sol-gel reaction mixture, or may result in undesirably small gel particles.

SUMMARY

In light of the present need for improved precursor particles for uranium carbides, oxycarbides, and/or nitrides, a brief summary of various embodiments is presented. Some simplifications and omissions may be made in the following summary, which is intended to highlight and introduce some aspects of the disclosed embodiments, but not to limit the scope of the disclosure. Detailed descriptions of embodiments adequate to allow those of ordinary skill in the art to make and use the disclosed concepts and/or compositions will follow in later sections.

Various exemplary embodiments relate to making composite gel particles including an ammonium diuranate matrix phase and a phenolic resin phase incorporated within the ammonium diuranate matrix phase. The method includes preparing a first solution comprising uranyl nitrate, a phenol, and optionally formaldehyde in a first portion of a first liquid carrier, wherein the uranyl nitrate and the phenol are present in a ratio ranging from 2:1 to 25:1; and preparing a second solution comprising hexamethylenetetramine and urea in a second portion of the first liquid carrier. The first solution and the second solution are mixed, and individual drops of the resulting mixture are added to a heated second liquid, where the first liquid carrier is immiscible in the second liquid. Heat from the second liquid causes the hexamethylenetetramine to decompose to form ammonia, and the ammonia reacts with the uranyl nitrate to cause each of the individual drops to form an ammonium diuranate gel particle. The ammonium diuranate gel particles formed from the individual drops of the mixture are then collected. Each ammonium diuranate gel particle includes a phenolic resin phase dispersed within an ammonium diuranate matrix phase. The phenolic resin phase is formed by a reaction between the phenol and formaldehyde.

In various embodiments, the first solution includes uranyl nitrate, the phenol, and formaldehyde; the formaldehyde and the phenol are present in the first solution in a ratio ranging from 1:1 to 5:1; and the formaldehyde and the phenol react to form the phenolic resin phase prior to mixing the first solution and the second solution. The phenolic resin phase forms as small particles of a phenolic resin suspended within the first solution; and the ammonium diuranate gel particles include the small particles of the phenolic resin within the ammonium diuranate matrix phase.

In various embodiments, the first solution does not include formaldehyde, and heat from the second liquid causes the hexamethylenetetramine to decompose to form ammonia and formaldehyde in situ. The formaldehyde and the phenol then react to form the phenolic resin phase while the ammonia reacts with the uranyl nitrate. Heat from the second liquid may cause the hexamethylenetetramine to form formaldehyde in situ, in an amount such that the ratio between the formaldehyde and the phenol in each of the individual drops ranges from 20:1 to 100:1.

The phenol in the first solution may be phenol, a benzenediol, a phenol substituted with a C1-C4 alkyl group, a benzenediol substituted with a C1-C4 alkyl group, or a mixture thereof. The phenol may be phenol, catechol, resorcinol, hydroquinone, 2-methylphenol, 3-methylphenol, 4-methylphenol, 2,3-dihydroxytoluene, 3,4-dihydroxytoluene, 2-methylbenzene-1,3-diol, 4-methylbenzene-1,3-diol, dihydroxytoluene, 2-methylbenzene-1,4-diol, 3-methylbenzene-1,4-diol, or a mixture thereof. The phenol may be phenol, catechol, resorcinol, 2-methylphenol, 3-methylphenol, 4-methylphenol, or a mixture thereof. In various embodiments, the phenol is resorcinol.

The first liquid carrier in the first and second solutions may be water or an aqueous solution, and the second liquid may be a water-immiscible organic phase. The water-immiscible organic phase may be a silicone oil or a hydrocarbon oil.

Various embodiments disclosed herein relate to composite gel particles including an ammonium diuranate matrix phase and a phenolic resin phase incorporated within the ammonium diuranate matrix phase. The particles may be made by mixing:

a first solution comprising uranyl nitrate, a phenol, and optionally formaldehyde in a liquid carrier, wherein the uranyl nitrate and the phenol are present in a ratio ranging from 2:1 to 25:1; and a second solution comprising hexamethylenetetramine and urea in the liquid carrier.

A drop of the resulting mixture is added to a heated second liquid, where the liquid carrier is immiscible in the second liquid. Heat from the second liquid causes the hexamethylenetetramine to decompose to form ammonia, and the ammonia reacts with the uranyl nitrate to cause the drop to form the desired ammonium diuranate gel particle. The ammonium diuranate gel particle includes a phenolic resin phase dispersed within an ammonium diuranate matrix phase. The phenolic resin phase is formed by a reaction between the phenol and formaldehyde.

Various embodiments disclosed herein relate to a ceramic uranium carbide, oxycarbide, or nitride kernel, produced by sintering a composite gel particle including an ammonium diuranate matrix phase and a phenolic resin phase incorporated within the ammonium diuranate matrix phase.

Various embodiments disclosed herein relate to a method of making composite gel particles including an ammonium diuranate matrix phase and phenolic resin particles incorporated within the ammonium diuranate matrix phase, using a uranyl nitrate solution including uranyl nitrate, a phenol, and a C1-C4 aldehyde in a first portion of a first liquid carrier, wherein the uranyl nitrate and the phenol are present in a ratio ranging from 2:1 to 25:1. The phenol and the C1-C4 aldehyde react in the uranyl nitrate solution to produce the phenolic resin particles suspended in the uranyl nitrate solution. The uranyl nitrate solution with the phenolic resin particles therein is mixed with a second solution comprising hexamethylenetetramine and urea in a second portion of the first liquid carrier. Individual drops of the resulting mixture are added to a heated second liquid, where:

the first liquid carrier is immiscible in the second liquid;

heat from the second liquid causes the hexamethylenetetramine to decompose to form ammonia; and the ammonia reacts with the uranyl nitrate to cause each of the individual drops to form an ammonium diuranate gel particle.

Finally, the ammonium diuranate gel particles formed from the individual drops of the mixture are collected.

The phenol in the first solution may be phenol, catechol, resorcinol, hydroquinone, 2-methylphenol, 3-methylphenol, 4-methylphenol, 2,3-dihydroxytoluene, 3,4-dihydroxytoluene, 2-methylbenzene-1,3-diol, 4-methylbenzene-1,3-diol, dihydroxytoluene, 2-methylbenzene-1,4-diol, 3-methylbenzene-1,4-diol, or a mixture thereof.

The C1-C4 aldehyde in the first solution may be formaldehyde, acetaldehyde, propionaldehyde, butyraldehyde, isobutyraldehyde, or a mixture thereof. The C1-C4 aldehyde in the first solution may be produced by depolymerization of 1,3,5-trioxane or 2,4,6-trimethyl-1,3,5-trioxane.

BRIEF DESCRIPTION OF THE DRAWINGS

In order to better understand various exemplary embodiments, reference is made to the accompanying drawings, wherein.

DETAILED DESCRIPTION

Figures 1, 2:
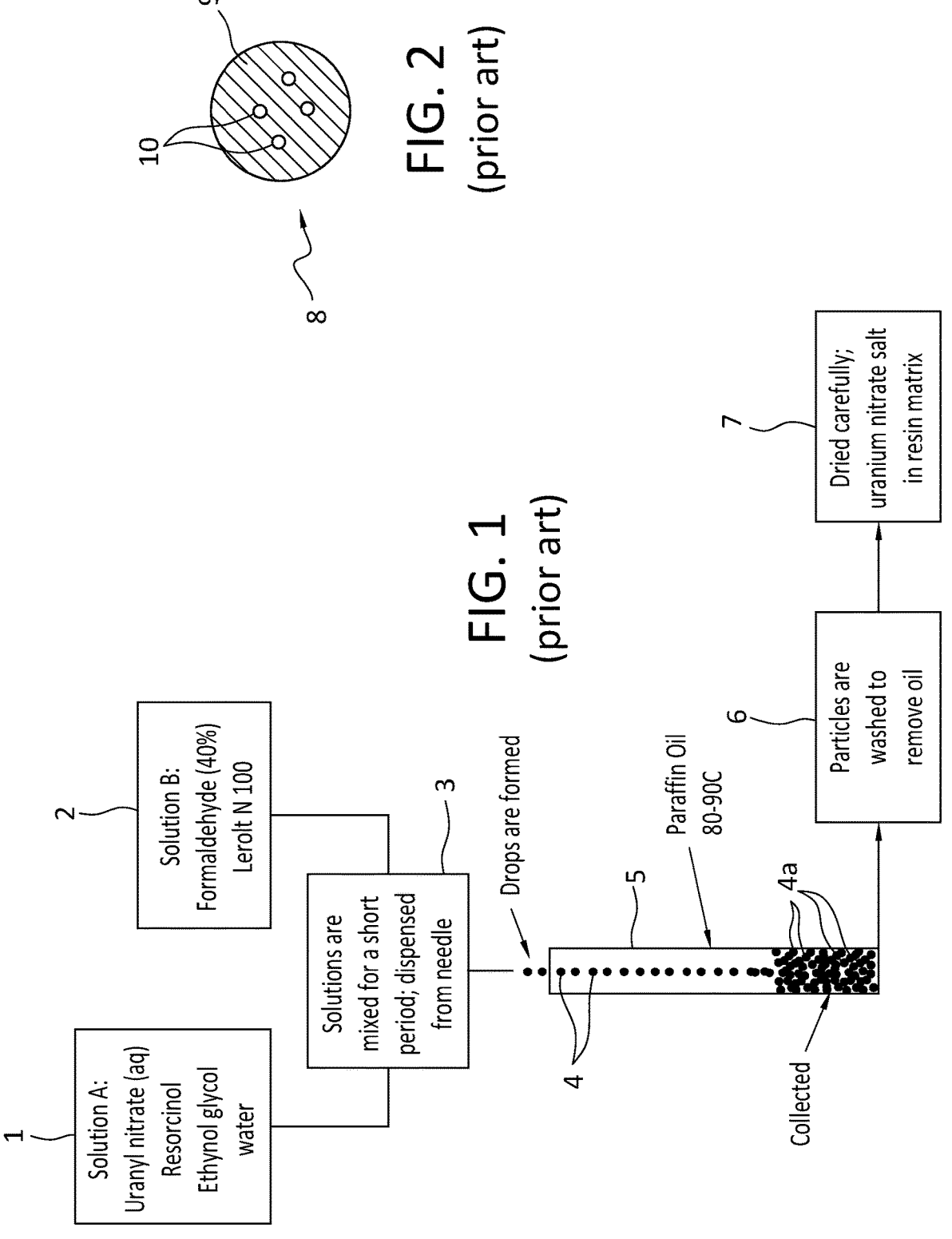
FIG. 1 illustrates a known method of preparing uranium-bearing phenolic resin particles.
FIG. 2 illustrates a particle prepared by the method of FIG. 1.

Referring now to the drawings, in which like numerals refer to like components or steps, there are disclosed broad aspects of various exemplary embodiments.

Formation of uranium carbide-based fuel may be done by forming a phenolic resin in the presence of resorcinol and formaldehyde. Koss et al., "Fabrication Methods and Evaluation of Uranium-Thorium-Carbide Fuel for High Temperature Gas Cooled Reactors," *Second International Thorium Fuel Cycle Symposium*, May 3-6, 1966, describes condensation of phenols with formaldehyde in the presence of uranyl nitrate. A uranyl nitrate solution containing resorcinol may be reacted with a surfactant-containing formaldehyde solution, and drops of the resulting solution are sprayed into an oil. In the method of Koss, the resin formed by reaction of resorcinol and formaldehyde polymerizes throughout the entire volume of each uranyl nitrate-containing drop, solidifying its structure and given providing its structural integrity. Particles of uranyl nitrate salt are dispersed inside the phenolic resin particles.

Referring to FIG. 1, an acidic solution containing uranyl nitrate and resorcinol in a molar ratio of 1:1 to 2.5:1 is formed in an aqueous medium (solution A, step 1). A second aqueous solution of formaldehyde and a surfactant is formed (solution B, step 2). Solution A and solution B are mixed (step 3) to produce a mixed solution containing formaldehyde and resorcinol in a ratio of 1.3:1 to 1:2, and droplets 4 of the mixed solution is sprayed into a container 5 of heated paraffin oil. The sprayed droplets 4 of the mixed solution are heated by the oil, and the formaldehyde reacts with the resorcinol within the droplets 4 to produce particles 4a of phenolic resin.

The method of Koss takes place in the absence of an ammonia or ammonium hydroxide source, e.g., hexamethylene tetramine. Accordingly, formation of the phenolic resin is acid-catalyzed, and uranyl nitrate is not converted into an ammonium diuranate gel. Phenolic resin particles 4a contain uranyl nitrate salts and/or uranium oxides entrapped within a phenolic resin matrix.

The phenolic resin particles 4a are washed with a hydrophobic solvent, e.g., hexane, alkyl ethers, tetrahydrofuran, benzene, and/or toluene, to remove residual paraffin oil (step 6). The resin particles are then dried carefully to produce solid particles with uranyl nitrate and/or uranium oxides dispersed within a resorcinol-formaldehyde phenolic resin matrix (step 7).

FIG. 2 shows a particle 8 produced by the process of FIG. 1. Each particle 8 contains a phenolic resin matrix 9 formed by condensation of resorcinol and formaldehyde under acidic conditions. Particles 10 of uranyl nitrate salts or uranium oxides are dispersed within matrix 9, forming a composite uranium-bearing phenolic resin particle.

The present disclosure, in contrast, is directed to manufacture of particles including an ammonium diuranate gel matrix, with a minor amount of a phenolic resin dispersed therein.

Figure 3:
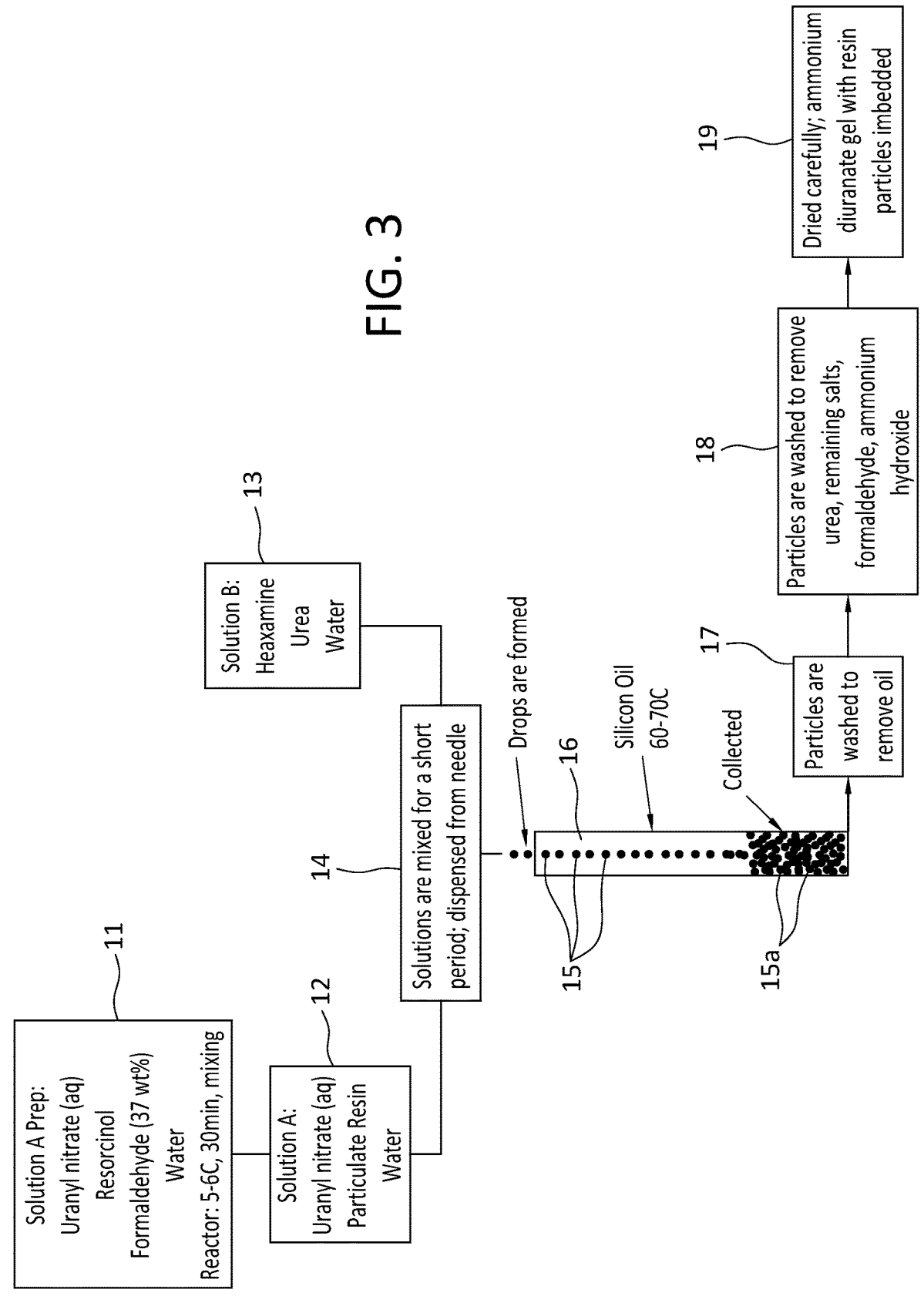
FIG. 3 illustrates a method of preparing uranium-bearing phenolic resin particles by reacting a uranyl nitrate solution containing phenolic resin with hexamethylenetetramine.

In a first embodiment, a first solution (solution A) is prepared in a first liquid carrier, as shown in FIG. 3, step 11. Solution A is an acid deficient uranyl nitrate solution with a pH ranging from 0.5 to 2.8, containing a phenol. The uranyl nitrate and phenol the are present in a mole ratio of 2:1 to 25:1, 7:1 to 20:1, 8:1 to 15:1, 9:1 to 12:1, or about 10:1. The phenol may be phenol, benzenediols, phenols substituted with a C1-C4 alkyl group, benzenediols substituted with a C1-C4 alkyl group, and mixtures thereof. The phenol may be phenol, catechol, resorcinol, hydroquinone, 2-methylphenol, 3-methylphenol, 4-methylphenol, 2,3-dihydroxytoluene, 3,4-dihydroxytoluene, 2-methylbenzene-1,3-diol, 4-methyl-benzene-1,3-diol, 2-methylbenzene-1,4-diol, 3-methylbenzene-1,4-diol, and mixtures thereof.

Next, an aldehyde is added to solution A. The aldehyde may be a C1-C4 aldehyde such as formaldehyde, acetaldehyde, propionaldehyde, butyraldehyde, isobutyraldehyde, or a mixture thereof. Alternatively, an aldehyde precursor may be added to solution A. The aldehyde precursor may be the formaldehyde precursor 1,3,5-trioxane or the acetaldehyde precursor 2,4,6-trimethyl-1,3,5-trioxane. The trioxane composition undergoes acid-catalyzed depolymerization in the acid deficient uranyl nitrate solution to produce the desired aldehyde. The aldehyde is added in an amount such that the mole ratio of aldehyde to phenol is 1:1 to 2:1, 1.25:1 to 1.9:1, 1.4:1 to 1.8:1, 1.5:1 to 1.75:1, or about 1.6. Solution A is cooled to 0-10° C., and maintained at that temperature for 30-90 min with vigorous mixing. The aldehyde and phenol are allowed to react under acidic conditions to form particles of a phenolic resin suspended in the acid-deficient uranyl nitrate solution (FIG. 3, step 12). Solution A is then allowed to warm to ambient temperature while stirring is continued. At this point, the condensation between the aldehyde and the phenol has consumed substantially all of the phenol.

A second solution (solution B) is formed in a second portion of the first liquid carrier containing urea, and hexamethylenetetramine, as shown in FIG. 3, step 13. The concentration of urea may be roughly equimolar with the concentration of hexamethylenetetramine, e.g., within about 20% of being equimolar. Solution A and solution B are mixed to form a mixed solution, and small drops 15 of the mixed solution are dispensed from a needle into a tubular chamber 16 having a diameter of up to 4 inches. Chamber 16 contains a second liquid which is immiscible with the first liquid carrier.

In various embodiments, the second liquid is a silicone oil or a paraffin oil. The first liquid carrier may be water or a polar organic solvent which is immiscible with the second liquid. The first liquid carrier may be water, ethylene glycol, dimethylformamide, dimethyl sulfoxide, or a mixture thereof, for example. When the mixed solution is added to the second liquid, the second liquid is preferably heated to a temperature of 45° C. to 95° C., 75° C. to 90° C., 50° C. to 80° C., 50° C. to 75° C., or 50° C. to 60° C. at atmospheric pressure. If temperatures in excess of 95° C. are desired, this may be done by:

using a nonaqueous solvent, e.g., dimethyl sulfoxide, as the first liquid carrier; or placing the second liquid in chamber 16 under elevated pressure, and using an aqueous liquid as the first liquid carrier.

The heated second liquid in chamber 16 causes decomposition of hexamethylenetetramine to form ammonium hydroxide in drops 15 of the mixed solution. The ammonium hydroxide promotes hydrolysis and condensation of ammonium nitrate to produce ammonium diuranate gel particles 15a. The gel particles 15a settle at the bottom of the tubular chamber, and are collected. As the phenol initially present in solution A was reacted with formaldehyde prior to addition to the heated oil, formaldehyde from decomposition of hexamethylenetetramine does not undergo substantial reaction with a free phenol compound. Formaldehyde from decomposition of hexamethylenetetramine may cause crosslinking between phenolic residues in particles of phenolic resin suspended in drops 15.

The gel particles are washed with a hydrophobic solvent, e.g., hexane, to remove residual silicone oil (FIG. 3, step 17). The gel particles are then washed with water or a mild aqueous acid to remove urea, nitrate salts, unreacted formaldehyde, and ammonium hydroxide (FIG. 3, step 18). Finally, the gel particles are dried carefully to produce solid particles 31 with an ammonium diuranate matrix with small resorcinol-formaldehyde phenolic resin particles dispersed therein (FIG. 3, step 19).

Figures 4, 5, 6:
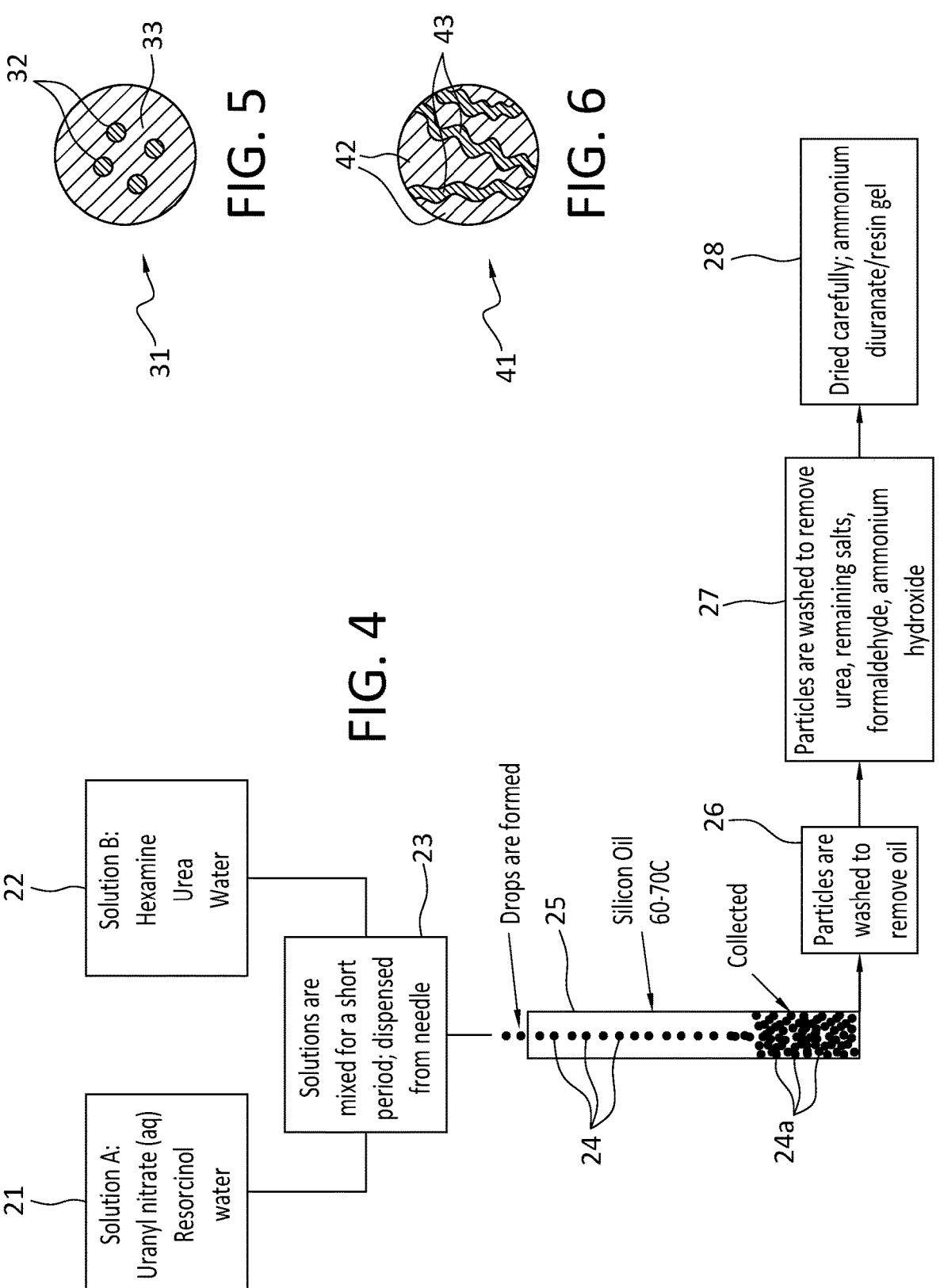
FIG. 4 illustrates a method of preparing uranium-bearing phenolic resin particles by reacting a uranyl nitrate solution containing resorcinol with hexamethylenetetramine.
FIG. 5 illustrates a particle prepared by the method of FIG. 3.
FIG. 6 illustrates a particle prepared by the method of FIG. 4.

As seen in FIG. 5, the gel particles 31 produced according to the process of FIG. 3 include an ammonium diuranate gel matrix 33, with small particles of phenolic resin 32 dispersed therein.

In a second embodiment, a first solution (solution A) is prepared in a first liquid carrier, as shown in FIG. 4, step 21. Solution A is an acid deficient uranyl nitrate solution with a pH ranging from 0.5 to 2.8, containing a phenol. The uranyl nitrate and phenol are present in a mole ratio of 2:1 to 25:1, 7:1 to 20:1, 8:1 to 15:1, 9:1 to 12:1, or about 10:1. The phenol may be phenol; benzenediols, e.g., catechol, resorcinol, hydroquinone, or a mixture thereof; phenols substituted with a C1-C4 alkyl group, e.g., 2-methylphenol, 3-methylphenol, 4-methylphenol, or a mixture thereof; or benzenediols substituted with a C1-C4 alkyl group, e.g., 2,3-dihydroxytoluene, 3,4-dihydroxytoluene, or a mixture thereof. In the embodiment of FIG. 4, solution A is free of aldehydes.

A second solution (solution B) is formed in a second portion of the first liquid carrier, where solution B contains urea and hexamethylenetetramine, as shown in FIG. 4, step 22. The concentration of urea may be roughly equimolar with the concentration of hexamethylenetetramine, e.g., within about 20% of being equimolar. Solution A and solution B are mixed to form a mixed solution, as shown in FIG. 4, step 23. Small drops 24 of the mixed solution are dispensed from a needle into a tubular chamber 25 having a diameter of up to 4 inches. Chamber 25 contains a second liquid which is immiscible with the first liquid carrier. The second liquid may be a silicone oil or a paraffin oil. The first liquid carrier may be a polar solvent which is immiscible with the second liquid, e.g., water, ethylene glycol, dimethylformamide, dimethyl sulfoxide, or a mixture thereof. When the mixed solution is added to the second liquid, the second liquid is preferably heated to a temperature of 45° C. to 95° C., 75° C. to 90° C., 50° C. to 80° C., 50° C. to 75° C., or 50° C. to 60° C. at atmospheric pressure.

The heated second liquid in chamber 16 causes decomposition of hexamethylenetetramine to form ammonium hydroxide and formaldehyde in drops 24 of the mixed solution. The ammonium hydroxide promotes hydrolysis and condensation of ammonium nitrate to produce ammonium diuranate gel particles 24a. The gel particles 24a settle at the bottom of the tubular chamber, and are collected. Simultaneously, formaldehyde generated in situ from decomposition of hexamethylenetetramine within drops 24 reacts with the phenol present in original solution A.

The gel particles 24a are collected and washed with a hydrophobic solvent, e.g., hexane, to remove residual silicone oil (FIG. 4, step 26). The gel particles are then washed with water or a mild aqueous acid to remove urea, nitrate salts, unreacted formaldehyde, and ammonium hydroxide (FIG. 4, step 27). Finally, the gel particles are dried carefully to produce solid particles 41 (FIG. 4, step 28).

As seen in FIG. 6, the gel particles 41 produced according to the process of FIG. 4 are composite particles including an ammonium diuranate gel matrix 42 with void spaces. The phenol from solution A reacts with formaldehyde generated in situ from hexamethylenetetramine decomposition to produce phenolic resin domains 43 filling the void spaces within matrix 42.

In a subsequent step, the dried gel particles 31 or 41 may be sintered to produce a uranium-based ceramic particle suitable for use as a nuclear fuel kernel. Ammonium diuranate may react to form the oxide $UO_2$, while phenolic resin present in the dried gel particles (the particles of phenolic resin 32 in particles 31 or the phenolic resin domains 43 in particles 41) serves as a carbon source. Elemental carbon produced from the phenolic resin during the sintering process reacts with uranium to produce uranium carbide UC. The result is a uranium oxycarbide or carbide ceramic particle of formula $UO_{(2-2x)}C_x$, where x is greater than 0 and may be up to 1. The value of x is dependent on the amount of carbon in dried gel particles 31. The amount of carbon in the sintered uranium oxycarbide ceramic particle may be increased by reducing the ratio of uranium nitrate to phenol in the initial solution A formed in step 11 of FIG. 3. Similarly, the amount of carbon in the uranium oxycarbide particle may be reduced by increasing the ratio of uranium nitrate to phenol in solution A.

Figure 7:
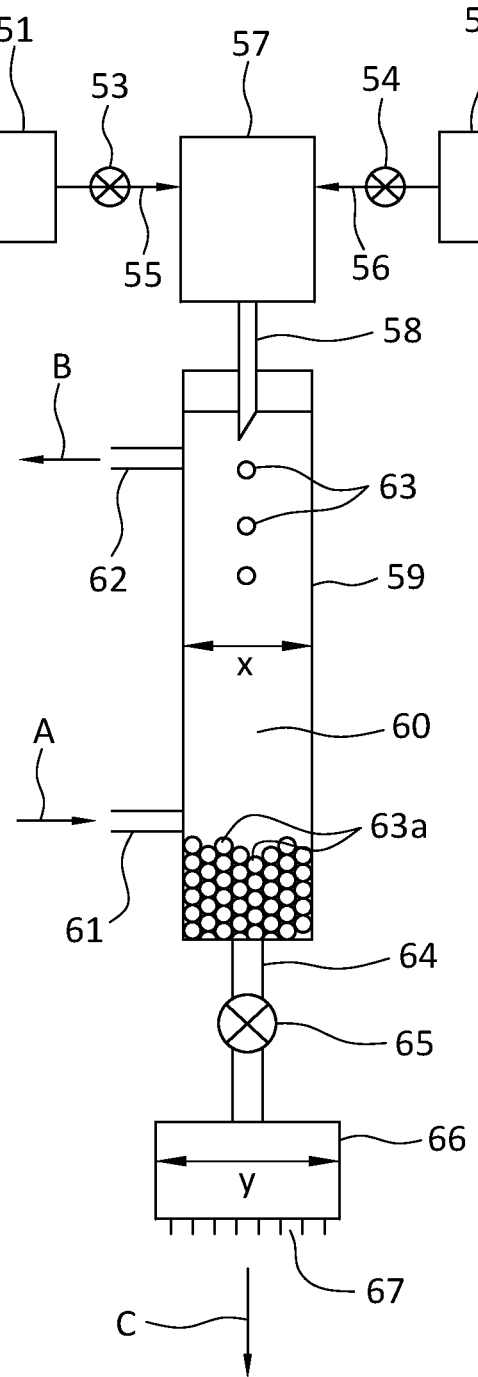
FIG. 7 illustrates an apparatus useful for the process depicted in FIGS. 3 and 4.

FIG. 7 shows an apparatus useful for the process depicted in FIGS. 3 and 4. Solution A (a phenol-containing aqueous uranyl nitrate solution) is fed from reservoir 52 to mixing chamber 57 through pipe 56, with flow rate of solution A being controlled by a valve 54. Solution B, containing hexamethylenetetramine and urea in an aqueous medium, is fed from reservoir 51 to mixing chamber 57 through pipe 55, with flow rate of solution B being controlled by a valve 53. Drops 63 of the mixed solution are fed from mixing chamber 57 through needle 58 into a heated water-immiscible oil 60 contained in gelling vessel 59. The heated oil causes the hexamethylenetetramine in the mixed solution to produce ammonium hydroxide, which reacts with uranyl nitrate in drops 63 to produce ammonium diuranate gel particles 63a. The heated oil may be heated in vessel 59, or heated externally. Externally heated oil may flow into vessel 59 through input 61 in the direction of arrow A, and may flow out of vessel 59 through output 62 in the direction of arrow B. Oil recovered from output 62 may be washed and recycled back to vessel 59.

Diuranate gel particles 63a settle at the bottom of chamber 59. Oil 60 and particles 63a may be drained from vessel 59 through output 64 after the completion of gel formation. While gel particle formation occurs, valve 65 is closed to prevent drainage through output 64. Once gel formation is complete, valve 65 is opened and oil 60 and particles 63a are drained through output 64. The drained oil and particles 63a are drained into a catch basin 66 with a grid or sieve 67 at the bottom. Particles 63a with a desired minimum particle size are captured by grid or sieve 67. Undersized particles 63a and the oil 60 pass through grid or sieve 67 in the direction of arrow C.

Reservoir 52, mixing chamber 57, vessel 59, and catch basin 59 may each contain nuclear material, and therefore may have any desired height, but should have a maximum width of about 4 inches or less to avoid criticality issues. As shown in FIG. 7, vessel 59 has a width of x, where x≤4 inches. Catch basin 66 has a width of y, where y≤4 inches, and y may be the same as, or different from, x.

The system as described above may be used for the method of FIG. 4, where phenol present in solution A in reservoir 52 reacts with formaldehyde produced in situ from hexamethylenetetramine decomposition to produce ammonium hydroxide and formaldehyde. If the user wishes to follow the method of FIG. 3, where phenol reacts with formaldehyde to produce phenolic resin particles suspended in a uranyl nitrate solution in reservoir 52, reservoir 52 should be modified as shown in FIG. 8.

Figure 8:
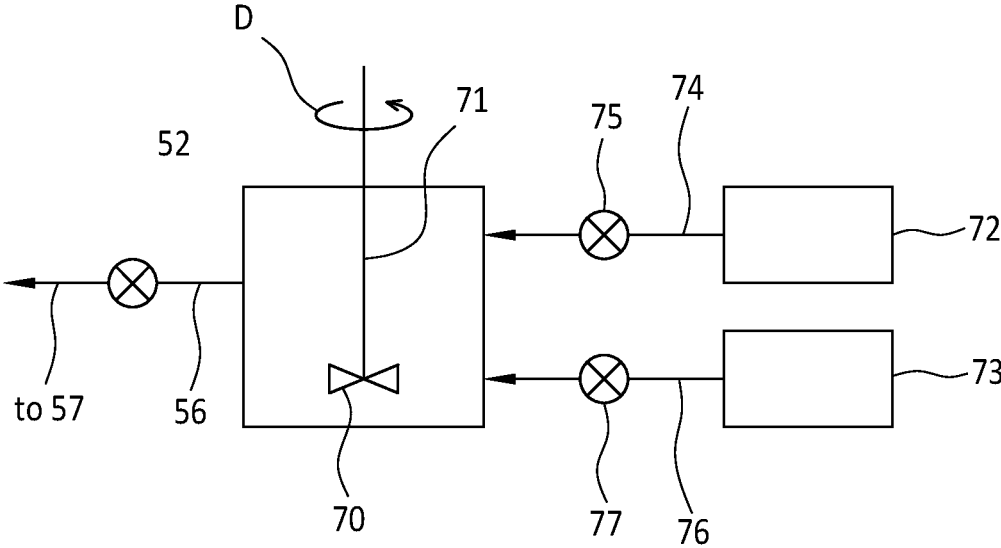
FIG. 8 illustrates a reservoir equipped with a stirrer.

FIG. 8 shows reservoir 52, equipped with a stirrer 70 having blades, where the stirrer 70 is mounted on a motorized shaft 71, configured to rotate in the direction of arrow D. Solution A, the phenol-containing aqueous uranyl nitrate solution, is fed from a reservoir 72 through pipe or tube 74 to reservoir 52. An aldehyde solution is fed from a reservoir 73 through pipe or tube 76 to reservoir 52. The flow rates of the uranyl nitrate solution and the aldehyde solution are controlled by valves 75 and 77, respectively. The mixed phenol/aldehyde solution in reservoir 52 is stirred with stirrer 70, and phenolic resin particles form and are suspended in aqueous uranyl nitrate solution. The contents of reservoir 52 are then fed to mixing chamber 57 through pipe 56.

Example 1

An acid-deficient uranyl nitrate solution (solution A) is formed comprising 753 g uranyl nitrate hexahydrate (1.5 moles), 16.6 g resorcinol (0.15 moles), and 200 g water, as shown in Table 1. Solution A generally has a pH ranging from 0.5 to 2.8.

Solution A is chilled to 5-6° C., as seen in FIG. 3. An aqueous solution containing 37 wt. % formaldehyde is added to solution A (FIG. 3, step 11). The formaldehyde solution is provided in an amount sufficient to provide solution A with 19.5 g formaldehyde. Solution A is maintained at 5-6° C. for 30 min with vigorous mixing. The formaldehyde and resorcinol are allowed to react at a mole ratio of 1.6:1 under acidic conditions to form small particles of a resorcinol-formaldehyde phenolic resin suspended in the acid-deficient uranyl nitrate solution (step 12). Solution A is then allowed to warm to ambient temperature while stirring is continued.

A second aqueous solution (solution B) is formed containing 118.3 g urea, and 295.8 g hexamethylenetetramine, as shown in Table 1 (FIG. 3, step 13).

TABLE 1

Solutions for ammonium diuranate/phenolic resin composite gel particles.

|  | mass (g) | molar mass (g/mol) | moles |
|---|---|---|---|
| Solution A |  |  |  |
| uranyl nitrate hexahydrate (U) | 753.0 | 502 | 1.50 |
| Resorcinol (R) | 16.6 | 110.1 | 0.15 |
| water | 200.0 | 18 | 11.11 |
| Formaldehyde (F), 37 wt % | 19.5 | 30.03 | 0.24 |
| Solution B |  |  |  |
| Urea | 118.3 | 60.06 | 1.97 |
| Hexamethylenetetramine | 295.8 | 140.186 | 2.11 |
| Mole Ratios |  |  |  |
| F/R molar ratio (F in Solution A) |  |  | 1.6 |
| U/R molar ratio |  |  | 10.0 |

After reaction to produce phenolic resin particles, solution A is mixed with solution B (step 14). The mixed solution is then added dropwise into a tubular chamber 16 having a diameter of 4 inches, containing a silicone oil at a temperature of 50-60° C. The heated oil causes decomposition of hexamethylenetetramine to form ammonium hydroxide in drops 15. The ammonium hydroxide promotes hydrolysis and condensation of ammonium nitrate to produce ammonium diuranate gel particles 15a. The gel particles 15a settle at the bottom of the tubular chamber, and are collected.

As the phenol initially present in solution A was reacted with formaldehyde prior to addition to the heated oil, formaldehyde from decomposition of hexamethylenetetramine does not undergo substantial reaction with phenols.

The gel particles are washed with a hydrophobic solvent, e.g., hexane, to remove residual silicone oil (step 17). The gel particles are then washed with water or a mild aqueous acid to remove urea, nitrate salts, unreacted formaldehyde, and ammonium hydroxide (step 18). Finally, the gel particles are dried carefully to produce solid particles with an ammonium diuranate matrix with small resorcinol-formaldehyde phenolic resin particles dispersed therein (step 19).

Example 2

An acid-deficient uranyl nitrate solution (solution A) is formed comprising 753 g uranyl nitrate hexahydrate (1.5 moles), 16.6 g resorcinol (0.15 moles), and 200 g water, as shown in Table 2 and in FIG. 4, step 21. Solution A generally has a pH ranging from 0.5 to 2.8.

A second aqueous solution (solution B) is formed containing 118.3 g urea, and 295.8 g hexamethylenetetramine, as shown in Table 2 and in FIG. 4, step 22.

Solution A is mixed with solution B (step 23). The mixed solution is then added dropwise into a tubular chamber 25 having a diameter of 4 inches, containing a silicone oil at a temperature of 50-60° C. The heated oil causes decomposition of hexamethylenetetramine to form ammonium hydroxide. The ammonium hydroxide promotes hydrolysis and condensation of ammonium nitrate to convert the drops 24 of mixed solution into ammonium diuranate gel particles 24a. Simultaneously, decomposition of hexamethylenetetramine within the drops of mixed solution produces formaldehyde within the ammonium diuranate gel particles 24a. The formaldehyde in the gel particles undergoes reaction with phenols to form a resorcinol-formaldehyde phenolic resin within the gel particles. Assuming complete decomposition of hexamethylenetetramine, so that each molecule of hexamethylenetetramine produces six equivalents formaldehyde, the formaldehyde and resorcinol are allowed to react at a mole ratio of 84.1:1, where basic conditions are present in the gel particles. The gel particles 24a settle at the bottom of the tubular chamber 25, and are collected.

TABLE 2

Solutions for ammonium diuranate/phenolic resin composite gel particles using formaldehyde generated in situ..

|  | mass (g) | molar mass (g/mol) | moles |
|---|---|---|---|
| Solution A |  |  |  |
| uranyl nitrate hexahydrate (U) | 753.0 | 502 | 1.50 |
| Resorcinol (R) | 16.6 | 110.1 | 0.15 |
| water | 200.0 | 18 | 11.11 |
| Solution B |  |  |  |
| Urea | 118.3 | 60.06 | 1.97 |
| Hexamethylenetetramine | 295.8 | 140.186 | 2.11 |
| Mole Ratios |  |  |  |
| F/R molar ratio (F from Hexamethylenetetramine decomposition) |  |  | 84.1 |
| U/R molar ratio |  |  | 10.0 |

The gel particles are washed with a hydrophobic solvent, e.g., hexane, to remove residual silicone oil (step 26). The gel particles are then washed with water or a mild aqueous acid to remove urea, nitrate salts, unreacted formaldehyde, and ammonium hydroxide (step 27). Finally, the gel particles are dried carefully to produce solid particles with an ammonium diuranate matrix with resorcinol-formaldehyde phenolic resin occupying void space throughout the ammonium diuranate matrix (step 28).

Comparative Example 3

This comparative example is based on Koss et al., *Second International Thorium Fuel Cycle Symposium*, May 3-6, 1966.

An acid-deficient uranyl nitrate solution (solution A) is formed comprising 540 g uranyl nitrate hexahydrate (1.08 moles), 120 g resorcinol (1.09 moles), and an aqueous medium with 240 g water and 30 g ethylene glycol, as shown in Table 3 and in FIG. 1, step 1. Solution A generally has a pH ranging from 0.5 to 2.8. Where the working examples disclosed herein, Examples 1 and 2, use uranyl nitrate hexahydrate and resorcinol in a mole ratio of 10:1, this comparative example uses uranyl nitrate hexahydrate and resorcinol in a mole ratio of ~1:1.

A second aqueous solution (solution B) is formed containing 105 g 40 wt. % formaldehyde and a surfactant, as shown in Table 3 and in FIG. 1, step 2.

TABLE 3

| Comparative example. | | | |
| --- | --- | --- | --- |
| | mass (g) | molar mass (g/mol) | moles |
| Solution A | | | |
| Uranyl nitrate hexahydrate (U) | 540 | 502 | 1.08 |
| Resorcinol (R) | 120 | 110.1 | 1.09 |
| ethylene glycol | 30 | 62.07 | 0.48 |
| water | 240 | 18 | 13.33 |
| Solution B | | | |
| Formaldehyde (F), 40 wt % | 105 | 30.03 | 1.40 |
| Ethoxylated nonylphenol (surfactant) | 0.5 | — | |
| Mole Ratios | | | |
| F/R molar ratio (F in Solution B) | | | 1.28 |
| U/R molar ratio | | | 0.99 |

Solution A is mixed with solution B (step 3). Drops of the mixed solution 4 are then sprayed into a container 5 of heated paraffin oil at a temperature of 90° C. In the heated oil, resorcinol and formaldehyde react to form a phenolic resin. The formaldehyde in the sprayed drops undergoes reaction with phenols to form resorcinol-formaldehyde phenolic resin particles 4a. The resin particles 4a settle at the bottom of the container 5 of heated paraffin oil, and are collected. Since the resin particles are formed in the absence of hexamethylenetetramine or another ammonium hydroxide source, uranyl nitrate does not undergo reaction to form ammonium diuranate.

The resin particles are washed with a hydrophobic solvent, e.g., hexane, to remove residual paraffin oil (step 6). The resin particles are then dried carefully to produce solid particles with solid uranyl nitrate dispersed within a resorcinol-formaldehyde phenolic resin matrix (step 7).

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of making composite gel particles comprising an ammonium diuranate matrix phase and a phenolic resin phase incorporated within the ammonium diuranate matrix phase, comprising:
preparing a first solution comprising uranyl nitrate, a phenol, and optionally formaldehyde in a first portion of a first liquid carrier, wherein the uranyl nitrate and the phenol are present in a mole ratio ranging from 2:1 to 25:1;
preparing a second solution comprising hexamethylenetetramine and urea in a second portion of the first liquid carrier;
mixing the first solution and the second solution to form a mixture;
adding individual drops of the mixture into a heated second liquid, wherein:
the first liquid carrier is immiscible in the second liquid;

heat from the second liquid causes the hexamethylenetetramine to decompose to form ammonia; and
the ammonia reacts with the uranyl nitrate to cause each of the individual drops to form an ammonium diuranate gel particle; and
collecting the ammonium diuranate gel particles formed from the individual drops of the mixture;
wherein the ammonium diuranate gel particles comprise the phenolic resin phase within the ammonium diuranate matrix phase;
wherein the phenolic resin phase is formed by reaction between the phenol and formaldehyde.

2. The method of claim 1, wherein:
the first solution comprises uranyl nitrate, the phenol, and formaldehyde,
the formaldehyde and the phenol are present in the first solution in a mole ratio ranging from 1:1 to 5:1; and
the formaldehyde and the phenol react to form the phenolic resin phase prior to mixing the first solution and the second solution.

3. The method of claim 2, wherein:
the phenolic resin phase forms as small particles of a phenolic resin suspended within the first solution;
the ammonium diuranate gel particles comprise the small particles of a phenolic resin within the ammonium diuranate matrix phase.

4. The method of claim 1, wherein:
the first solution does not include formaldehyde,
heat from the second liquid causes the hexamethylenetetramine to decompose to form ammonia and formaldehyde in situ; and
the formaldehyde and the phenol react to form the phenolic resin phase while the ammonia reacts with the uranyl nitrate.

5. The method of claim 1, wherein the phenol is selected from the group consisting of phenol, benzenediols, phenols substituted with a C1-C4 alkyl group, benzenediols substituted with a C1-C4 alkyl group, and mixtures thereof.

6. The method of claim 1, wherein the phenol is selected from the group consisting of phenol, catechol, resorcinol, hydroquinone, 2-methylphenol, 3-methylphenol, 4-methylphenol, 2,3-dihydroxytoluene, 3,4-dihydroxytoluene, 2-methylbenzene-1,3-diol, 4-methylbenzene-1,3-diol, dihydroxytoluene, 2-methylbenzene-1,4-diol, 3-methylbenzene-1,4-diol, and mixtures thereof.

7. The method of claim 6, wherein the phenol is phenol, catechol, resorcinol, 2-methylphenol, 3-methylphenol, 4-methylphenol, or a mixture thereof.

8. The method of claim 7, wherein the phenol is resorcinol.

9. The method of claim 1, wherein:
the first liquid carrier is water or a aqueous solution, and
the second liquid is a water-immiscible organic phase.

10. The method of claim 9, wherein the water-immiscible organic phase is a silicone oil or a hydrocarbon oil.

11. A method of making composite gel particles comprising an ammonium diuranate matrix phase and phenolic resin particles incorporated within the ammonium diuranate matrix phase, comprising:
preparing a uranyl nitrate solution comprising uranyl nitrate, a phenol, and a C1-C4 aldehyde in a first portion of a first liquid carrier, wherein the uranyl nitrate and the phenol are present in a mole ratio ranging from 2:1 to 25:1;
preparing a second solution comprising hexamethylenetetramine and urea in a second portion of the first liquid carrier;

reacting the phenol and the C1-C4 aldehyde in the uranyl
nitrate solution to produce the phenolic resin particles
suspended in the uranyl nitrate solution;

mixing the uranyl nitrate solution with the phenolic resin
particles therein and the second solution to form a
mixture;

adding individual drops of the mixture into a heated
second liquid, wherein:

the first liquid carrier is immiscible in the second
liquid;

heat from the second liquid causes the hexamethyl-
enetetramine to decompose to form ammonia; and the ammonia reacts with the uranyl nitrate to cause
each of the individual drops to form an ammonium
diuranate gel particle; and collecting the ammonium diuranate gel particles formed
from the individual drops of the mixture;

wherein the ammonium diuranate gel particles com-
prise the phenolic resin particles within the ammo-
nium diuranate matrix phase.

12. The method of claim 11, wherein the phenol is
selected from the group consisting of phenol, catechol,
resorcinol, hydroquinone, 2-methylphenol, 3-methylphenol,
4-methylphenol, 2,3-dihydroxytoluene, 3,4-dihydroxytolu-
ene, 2-methylbenzene-1,3-diol, 4-methylbenzene-1,3-diol,
dihydroxytoluene, 2-methylbenzene-1,4-diol, 3-methylben-
zene-1,4-diol, and mixtures thereof.

13. The method of claim 11, wherein the C1-C4 aldehyde
is:

selected from the group consisting of formaldehyde,
acetaldehyde, propionaldehyde, butyraldehyde, isobu-
tyraldehyde, and a mixture thereof; or produced by depolymerization of 1,3,5-trioxane or 2,4,6-
trimethyl-1,3,5-trioxane.

* * * * *